May 19, 1953 — L. W. SAGE — 2,638,866

COMBINATION PRESSURE AND COST COMPUTING GAUGE ATTACHMENT

Filed June 13, 1950

INVENTOR
*Luther W. Sage*

BY *Mason, Fenwick & Lawrence*
ATTORNEYS

Patented May 19, 1953

2,638,866

UNITED STATES PATENT OFFICE 2,638,866

COMBINATION PRESSURE AND COST COMPUTING GAUGE ATTACHMENT

Luther W. Sage, Grundy, Va.

Application June 13, 1950, Serial No. 167,885

2 Claims. (Cl. 116—129)

This invention relates to gauges, and more particularly to adjustable hands or pointers for use therewith.

Those who use so-called bottled gases, particularly in industry where acetylene is used for welding and the like, have been faced with the problem of determining the amount of gas used during a given period. The gas is expensive, and its cost becomes a major item in the determination of the cost of a particular job. In repair shops, the amount of gas used must be calculated in the price charged for the work. Up to the present, the cost has been figured roughly from the gauge which is commonly used on such tanks to indicate the cubic feet of gas left in the tank. As it is impossible to determine the cost with accuracy in this manner, either the repairman or the customer loses on the job.

The object of the present invention is to provide means whereby the accurate cost of the gas used for each job, or during a given period of time, may be quickly ascertained.

It is a further object of the invention to provide such means which will work in conjunction with the present volume gauge, either as a built-in part of that gauge or as an attachment therefor.

Other objects of the invention will appear from the following description of an embodiment of the invention when taken in conjunction with the drawings which accompany and form a part of this specification.

Figure 1:
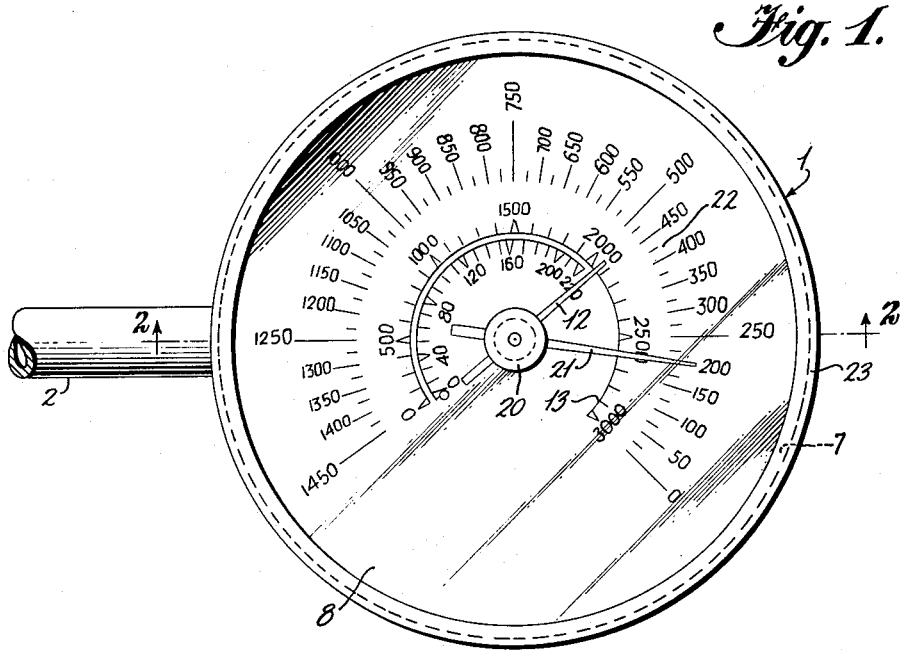
Figure 1 is a plan view of a gauge equipped with the present invention.
Figure 2:
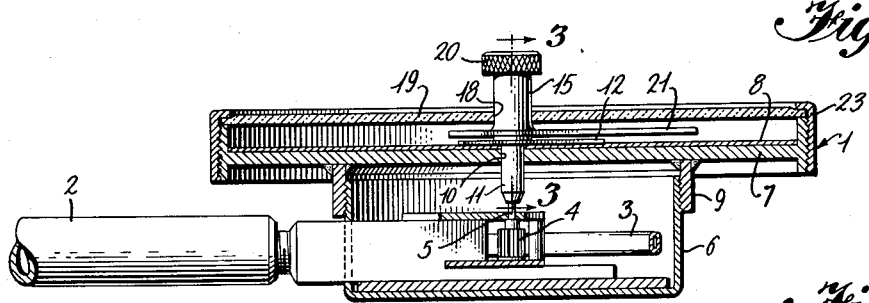
Figure 2 is a vertical diametrical section taken on the line 2—2 of Figure 1.
Figure 4:
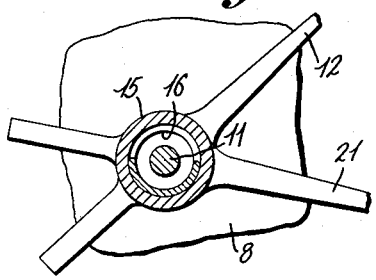
Figure 3:
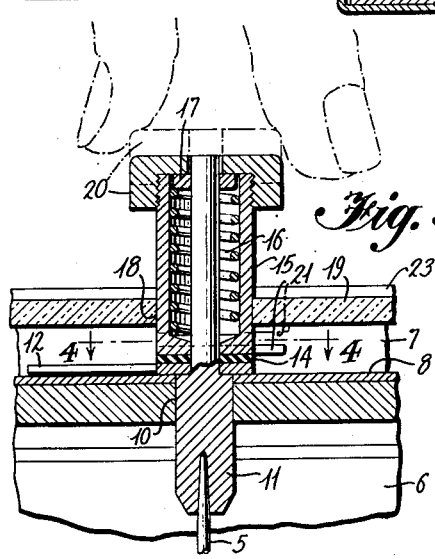
Figure 3 is an enlarged vertical section through the mounting post for the auxiliary hand and adjacent portion of the gauge; and, Figure 4 is a fragmentary horizontal section taken on the line 4—4 of Figure 3.

Referring to the drawings in detail, there is shown a gauge 1 of the general type used to indicate the volume of gas in a container. These gauges are usually connected to the gas container by means of the pipe 2, and a valve (not shown) is used to cut off the line 2 when the gas is not being used. The gauge employs the usual Bourdon tube 3, which serves, in known fashion, to rotate gear 4. The gear is fixed upon a spindle 5 which projects upwardly, and to which an indicator hand is normally attached. All of these parts are enclosed in a housing 6.

In place of the close fitting bezel generally employed, the present invention contemplates the use of a second, or dial housing, 7 screwed to the top of the housing 6. Dial housing 7 is of considerably larger diameter than housing 6, in order to accommodate the dial 8 which is of substantial size and seated within the housing. The base of the dial housing 7 is provided with a depending collar 9 which threads onto the usual threads at the top of housing 6. The center of the base of housing 7 has an opening 10 through which a stem 11 passes. Stem 11 has a central bore extending upwardly from its base to fit upon, and frictionally engage, the spindle 5. The hands, or pointers, of the gauge are carried upon this stem.

Hand 12 is mounted directly upon stem 11, and fixed to it so that rotative movement of the stem will result in movement of the hand. Hand 12 is relatively short and adapted to move over a scale 13 on the dial 8 which is marked to indicate the cubic feet of gas within the cylinder.

A friction washer 14 is slipped on the stem 11 on top of the hand 12, and barrel 15 is then fitted in place upon the stem, seated upon the washer 14. A coiled spring 16 is positioned within the barrel, and a spring retaining ring 17 is fixedly connected to the stem to hold the spring under compression and to form a stop against which the spring may act when the barrel is lifted. The barrel extends through an opening 18 in the glass protective face 19 which covers the dial 8, and a knurled knob 20 screws onto the upper end of the barrel, closing the end of the barrel and providing a means for rotating the barrel and the hand 21 which is attached to the barrel. Hand 21 overlies hand 12 and is longer than hand 12, and moves over a scale 22 on the dial. Scale 22 is calibrated to indicate the cost of the gas. The glass face 19 is held in position upon the housing 7 by means of a bezel 23 threaded onto the upper side wall of dial housing 7.

In operating the device, the usual valve is opened to cause the gas pressure to fill the Bourdon tube and move hand 12 to indicate the volume of gas within the container. Knob 20 is pulled outward to lift the barrel from contact with washer 14, and rotated until hand 21 is over the zero mark on scale 22. The knob is then released and the barrel, under the influence of spring 16, moves back into contact with washer 14. As gas is consumed, and hand 12 moves over its scale, hand 21 will also move due to the frictional engagement of the hands with the washer 14. Thus, at any time the operator will have an exact indication of the cost of the gas used. Even if it is necessary to close the valve to shut off the gas supply, and so cause the hand 12 to return to its inoperative position, the relative positions of the hands 12 and 21 will be maintained, and when the valve is opened the hand 21 will return to the position it occupied prior to closing the valve. Continued use of the gas will cause the hands to move and when the particular job is completed hand 21 will indicate the cost of the gas used on that job even though the gas was used at spaced intervals.

It will be obvious that the gauge may be manufactured in its disclosed form, or the dial housing 7 may be made as an attachment to convert standard gauges. In the latter event, the glass face and hand of the conventional gauge will be removed and the housing 7 screwed in place upon the housing 6. The hand assembly, with the knob removed, will be inserted in the opening 10 to seat the stem 11 upon the spindle 5, and the glass face 19 will be placed upon the housing 7 and the bezel 23 screwed in place. The barrel 15 will extend through the glass and knob 20 may be threaded on it. Thus, the standard gauge may be quickly and simply converted to a cost indicating gauge.

While in the above, one practical embodiment of the invention has been disclosed, it will be understood that various changes may be made from the precise embodiment illustrated and described without departing from the scope of the invention as defined in the appended claims.

What is claimed is:

1. An attachment for gauges having a housing threaded about its peripheral edge and a driven spindle, a dial housing having a threaded collar to fit upon said gauge housing, a dial having concentric volume and cost indicating scales, a stem projecting through an opening in said dial housing for driving engagement with said spindle, a hand fixedly mounted on said stem within the dial housing for movement over said volume scale, a friction disk upon said stem in engagement with said hand, a barrel rotatably mounted upon said stem, a spring surrounding said stem within said barrel to yieldably hold said barrel in contact with said disk, and a hand carried by said barrel for movement over said cost indicating scale.

2. In an attachment for gauges as claimed in claim 1, a glass face over said dial, said barrel protruding through said glass face, and a knob attached to said barrel for lifting said barrel against the pressure of said spring away from said disk and for rotating said cost hand when the barrel is so lifted.

LUTHER W. SAGE.

References Cited in the file of this patent

UNITED STATES PATENTS

| Number | Name | Date |
|---|---|---|
| 373,078 | Mann | Nov. 15, 1887 |
| 1,407,987 | Crane | Feb. 28, 1922 |
| 2,169,048 | Howe et al. | Aug. 8, 1939 |
| 2,505,237 | Dwyer | Apr. 25, 1950 |

FOREIGN PATENTS

| Number | Country | Date |
|---|---|---|
| 105,782 | Austria | Mar. 10, 1927 |